(12) United States Patent
Madasu et al.

(10) Patent No.: US 11,488,025 B2
(45) Date of Patent: Nov. 1, 2022

(54) HYBRID NEURAL NETWORK AND AUTOENCODER

(71) Applicant: Landmark Graphics Corporation, Houston, TX (US)

(72) Inventors: Srinath Madasu, Houston, TX (US); Keshava Prasad Rangarajan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 337 days.

(21) Appl. No.: 16/954,446

(22) PCT Filed: Dec. 16, 2019

(86) PCT No.: PCT/US2019/066621
§ 371 (c)(1),
(2) Date: Jun. 16, 2020

(87) PCT Pub. No.: WO2020/222879
PCT Pub. Date: Nov. 5, 2020

(65) Prior Publication Data
US 2021/0201160 A1 Jul. 1, 2021

Related U.S. Application Data

(60) Provisional application No. 62/840,198, filed on Apr. 29, 2019.

(51) Int. Cl.
*G06N 3/08* (2006.01)
*G06N 3/04* (2006.01)

(52) U.S. Cl.
CPC ........... *G06N 3/088* (2013.01); *G06N 3/0454* (2013.01)

(58) Field of Classification Search
CPC ........ G06N 3/088; G06N 3/0454; G06N 3/08; G06N 3/0472; G06N 3/0481; G06N 3/049;
(Continued)

(56) References Cited

U.S. PATENT DOCUMENTS

2018/0240219 A1*  8/2018  Mentl ...................... G06N 3/08
2018/0253640 A1   9/2018  Goudarzi et al.
(Continued)

FOREIGN PATENT DOCUMENTS

| KR | 20180069877 A | 6/2018 |
| WO | 2016100814 | 6/2016 |
| WO | 2020222879 A1 | 11/2020 |

OTHER PUBLICATIONS

"NO Application No. 20211156, First Office Action", dated Mar. 16, 2022, 6 pages.
(Continued)

*Primary Examiner* — Yogeshkumar Patel
(74) *Attorney, Agent, or Firm* — Delizio, Peacock, Lewin & Guerra

(57) ABSTRACT

A physics-influenced deep neural network (PDNN) model, or a deep neural network incorporating a physics-based cost function, can be used to efficiently denoise sensor data. To generate the PDNN model, noisy sensor data is used as training data input to a deep neural network and training output is valuated with a cost function that incorporates a physics-based model. An autoencoder can be coupled to the PDNN model and trained with the reduced-noise sensor data which is output from the PDNN during training of the PDNN or with a separate set of sensor data. The autoencoder detects outliers based on the reconstructed reduced-noise sensor data which it generates. Denoising sensor data by leveraging an autoencoder which is influenced by the physics of the underlying domain based on the incorporation of
(Continued)

the physics-based model in the PDNN facilitates accurate and efficient denoising of sensor data and detection of outliers.

20 Claims, 12 Drawing Sheets

(58) Field of Classification Search
CPC ....... G06N 3/082; G06F 16/55; G06F 9/6215; G06K 9/6232
See application file for complete search history.

(56) References Cited

U.S. PATENT DOCUMENTS

| | | | |
|---|---|---|---|
| 2018/0306609 | A1 | 10/2018 | Agarwal et al. |
| 2019/0064389 | A1 | 2/2019 | Denli et al. |
| 2019/0087726 | A1 | 3/2019 | Greenblatt et al. |
| 2019/0096038 | A1* | 3/2019 | El-Khamy ............... G06N 3/08 |
| 2019/0096049 | A1* | 3/2019 | Kim ........................ G06N 3/08 |
| 2019/0220691 | A1* | 7/2019 | Valpola .................... G06N 3/08 |

OTHER PUBLICATIONS

"PCT Application No. PCT/US2019/066621, International Preliminary Report on Patentability", dated Nov. 11, 2021, 6 pages.
PCT Application Serial No. PCT/US2019/066621, International Search Report, dated Apr. 20, 2020, 3 pages.
PCT Application Serial No. PCT/US2019/066621, Written Opinion, dated Apr. 20, 2020, 4 pages.
Baseman, et al., "Interpretable Anomaly Detection for Monitoring of High Performance Computing Systems", In: Outlier Definition, Detection, and Description on Demand Workshop at ACM SIGKDD, San Francisco, 2016, 8 pages.
Biazar, et al., "Exact and numerical solutions for non-linear Burger's equation by VIM", Mathematical and Computer Modelling, vol. 49, Issues 7-8, Elsevier Ltd., 2009, 7 pages.
Li, et al., "Denoising Convolutional Autoencoder Based B-Mode Ultrasound Tongue Image Feature Extraction", 2019 IEEE International Conference on Acoustics, Speech and Signal Processing, IEEE, Mar. 3, 2019, 5 pages.
Borghesi, et al., "Anomaly Detection using Autoencoders in High Performance Computing Systems", arXiv preprint arXiv:1811.05269, 2018, 9 pages.
Deng, "Mathematical Approaches to Digital Color Image Denoising", Georgia Institute of Technology, 2009, 95 pages.
Jidesh, et al., "A Complex Diffusion Driven Approach for Removing Data-Dependent Multiplicative Noise", PReMI 2013, Lecture Notes in Computer Science, vol. 8251, Springer, Berlin, Heidelberg, 2013, 6 pages.
Liu, et al., "A Stacked Autoencoder-Based Deep Neural Network for Achieving Gearbox Fault Diagnosis", Hindawi Mathematical Problems in Engineering 2018, Hindawi, Jul. 25, 2018, 10 pages.
Windrim, et al., "A Physics-Based Deep Learning Approach to Shadow Invariant Representations of Hyperspectral Images", In: IEEE Transactions on Image Processing, vol. 27, No. 2, Feb. 2018, 13 pages.

* cited by examiner

HYBRID NEURAL NETWORK AND AUTOENCODER

TECHNICAL FIELD

The disclosure generally relates to the field of data processing, and to modeling, design, simulation, or emulation.

BACKGROUND

In wellbore operations and other industrial operations, data output by sensors can be affected by physical phenomena such as acoustic vibrations, impacts, and unexpected electrical discharges. In many settings, the effects of these physical phenomena are mitigated using an autoencoder. In these scenarios, an autoencoder is a neural network that receives sensor data as input values, encodes the input values in a reduced form using a learned encoding, and then decodes the encoded input values to generate reduced-noise sensor data as its output.

BRIEF DESCRIPTION OF THE DRAWINGS

Embodiments of the disclosure may be better understood by referencing the accompanying drawings.

DESCRIPTION OF EMBODIMENTS

Figure 1:
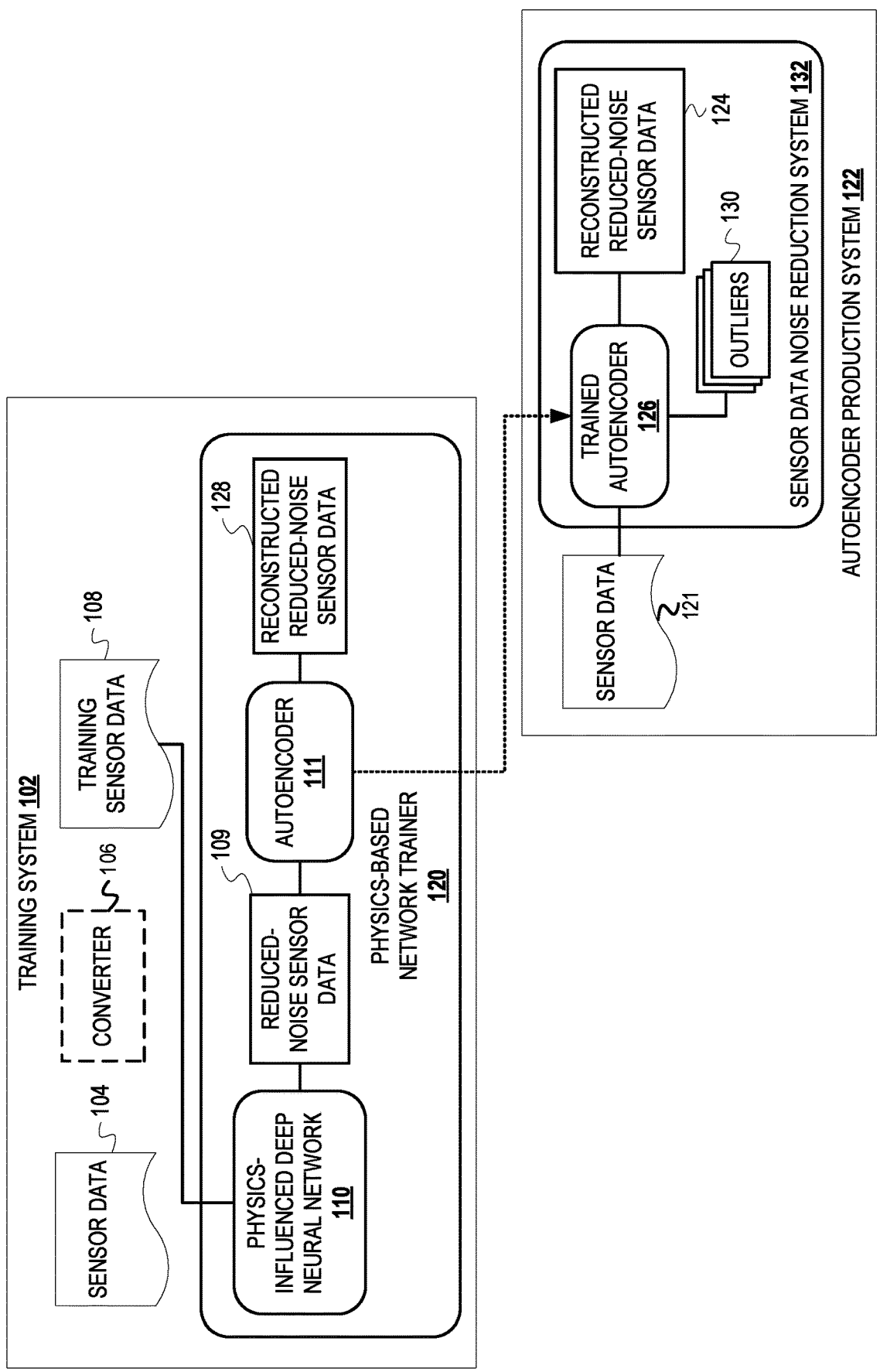
FIG. 1 is an example conceptual diagram of denoising sensor data using an autoencoder which was trained with output of a physics-informed deep neural network (PDNN).

The description that follows includes example systems, methods, techniques, and program flows that embody embodiments of the disclosure. However, it is understood that this disclosure may be practiced without these specific details. For instance, this disclosure refers to a deep neural network in illustrative examples. Aspects of this disclosure can be also applied to other neural networks such as a recurrent neural network or a long short-term-memory neural network. In other instances, well-known instruction instances, protocols, structures and techniques have not been shown in detail in order not to obfuscate the description.

Overview

A physics-influenced deep neural network (PDNN) model, or a deep neural network incorporating a physics-based cost function, can be used to efficiently denoise sensor data. The PDNN model can output a clean/denoised version of input sensor data containing noise more efficiently than, for example, using a wavelet or a Fourier series-based method. To generate the PDNN model, noisy sensor data is used as training data input to a deep neural network and training output is valuated with a cost function that incorporates one or more physics-based models. By incorporating a physics-based model in the cost function, the PDNN model can quantitatively differentiate between different physical processes and can also further distinguish the presence of physical phenomena that are of relevance to an operation from irrelevant processes and system noise. Incorporating physics into the PDNN model rather than utilizing a purely data-based approach improves the predictive model of the PDNN for generating a reduced-noise representation of sensor data.

When denoising sensor data with an autoencoder, various physical phenomena such as collisions and uncompensated vibration can reduce the accuracy of the autoencoder. To mitigate the inaccuracies which may result from denoising sensor data with an autoencoder alone, an autoencoder can be coupled to the PDNN model. The autoencoder can be trained with the reduced-noise sensor data which is output from the PDNN during training of the PDNN. By training the autoencoder with the output from the PDNN, the input data which the autoencoder is trained to reconstruct is preprocessed, reduced-noise sensor data rather than the raw sensor data. The trained autoencoder can thus effectively denoise raw sensor data by reconstructing the reduced-noise sensor data from the raw sensor data received as input. Alternatively, a denoising autoencoder trained on a separate set of sensor data (i.e., data that was not output from the PDNN during training) can be used to denoise sensor data, where the output of the trained PDNN is the input for the trained autoencoder. The autoencoder can also detect outliers in the sensor data based on the reconstructed reduced-noise sensor data which it generates. Denoising sensor data by leveraging an autoencoder which is influenced by the physics of the underlying domain based on the incorporation of the physics-based model in the PDNN, which can be coupled to the autoencoder either during training or during use, facilitates accurate and efficient denoising of sensor data and detection of outliers.

Example Illustrations

FIG. 1 is an example conceptual diagram of denoising sensor data using an autoencoder which was trained with output of a PDNN. The PDNN is a deep neural network which incorporates a physics-based model for determining reduced-noise sensor data, where the physics-based model is also included in the cost function used to evaluate the output of the PDNN during training FIG. 1 depicts a training system 102 and an autoencoder production system 122. The training system 102 includes a physics-based network trainer ("network trainer") 120. The network trainer 120 trains a deep neural network 110 with a physics-based cost function to generate the PDNN (hereinafter the "PDNN 110"). The PDNN 110 can include any number of layers, which may be dense layers, convolutional layers, pooling layers, normalization layers, etc. The network trainer 120 also trains an autoencoder 111. The autoencoder 111 can be a denoising autoencoder which comprises any number of dense layers for encoding and decoding. The network trainer 120 uses sensor data 104 captured during a downhole hydrocarbon recovery operation for training the PDNN 110. The network trainer 120 trains the autoencoder 111 with the output of the PDNN 110 which is produced during training to generate a trained autoencoder 126. The trained autoencoder 126 is deployed to a sensor data noise reduction system 132 of the autoencoder production system 122.

The training system 102 obtains the sensor data 104 collected during a hydrocarbon recovery operation. For example, the sensor data 104 may include fluid velocity data, pressure data, temperature data, fluid viscosity data, fluid density data, weight on bit data, drill bit rotational velocity data, etc. The sensor data 104 may be retrieved by the training system 102 or communicated to the training system 102 (e.g., by downhole components coupled to sensors of a drilling system). Once the sensor data 104 is available, the network trainer 120 can train the PDNN 110 with a subset of sensor data 104, such as a training set 108 of the sensor data 104 ("sensor data 108"). A converter 106 may be used to convert the sensor data 104 and/or the sensor data 108 to a normalized form prior to training the PDNN 110. For example, the converter 106 can be used to convert floating point data to a normalized value ranging from 0 to 1.

The network trainer 120 can use any training method to train the PDNN 110. For instance, the network trainer 120 can train the PDNN 110 using backpropagation. The PDNN 110 evaluates reduced-noise sensor data 109 output during training with a cost function which incorporates a physics-based model. A physics-based model can be incorporated in the cost function used to evaluate output of the PDNN 110 because a physics-based model is similar to a regularization component which may conventionally be used to evaluate output of a deep neural network during training Generally, the physics-based cost function can be represented as shown in Equation 1, where C represents a cost function value, P represents a solution to a physics-based model, and D represents a data-based value.

$$C = P + D \quad (1)$$

Specifically, the cost function used for evaluating output of the PDNN 110 can be represented as depicted below in Equation 2, where the physics-based model $f(z)$ is a differentiable physics-based function, $\lambda$ is multiplier value that can be similar to or equal to a Lagrange multiplier, z is any value or set of values based on output from a sensor (i.e., the sensor data 108), y represents reduced-noise sensor data (e.g., the reduced-noise sensor data 109), and $\Omega$ represents the domain space on which z is defined. The physics-based function $f(z)$ can be a physics-based model in the oil and gas domain. Examples of physics-based models which can be incorporated as the physics-based function $f(z)$ include Burger's equation, Darcy's law, and a hydraulic fracturing model equation.

$$E(y) = \|y-z\|_{L^2(\Omega)}^2 + \lambda f(z) \quad (2)$$

To recover the reduced-noise sensor data 109 from the sensor data 108, the PDNN 110 determines values of the reduced-noise sensor data which minimize a noise component of the sensor data 108. The reduced-noise sensor data 109 can be determined by solving the partial differential equation (PDE) corresponding to Equation 2 through constrained optimization as a function of space x and time t with the initial condition y(x,0) and boundary conditions y(0,t) and y(L,t) placed on y. This minimization of the noise component can be represented with the constrained optimization problem for cost function minimization represented by Equation 3, where $E_\Omega^z(y)$ represents a cumulative value of E(y) over the domain space $\Omega$. Equation 3 is subject to a noise constraint which is represented by Equation 4, where $\sigma$ is a variance value, y−z is an error with the prescribed noise value, and $|y-z|^2$ represents a mean square error value.

$$E(y) = \operatorname{argmin}_z(E_\Omega^z(y)) \quad (3)$$

$$|y-z|^2 = \sigma^2 \quad (4)$$

The PDNN 110 can solve Equation 3 as constrained by the noise constraint represented in Equation 4 using any one or more optimization techniques, such as gradient descent, simulated annealing, Bayesian optimization, genetic algorithms, etc. The reduced-noise sensor data 109, or y, is recovered as the solution to Equation 3 as constrained by Equation 4. In some implementations, the multiplier $\lambda$ can be changed to control the quantitative effect on the cost function value E(y) which the physics-based function $f(z)$ has relative to the data-driven value y−z. As the value of $\lambda$ increases, the effect of the physics-based function $f(z)$ increases in dominance and can play a greater role in filtering for the minimization.

The physics-based network trainer 120 can train the PDNN 110 iteratively based on evaluation of the reduced-noise sensor data 109 by using the physics-based cost function represented in Equation 2. For instance, the PDNN 110 may establish a cost value threshold. If the value of the physics-based cost function calculated based on one or more sensor data 108 inputs and reduced-noise sensor data 109 outputs exceeds the threshold, the weights associated with neuron connections of the PDNN 110 can be adjusted before re-computing the reduced-noise sensor data 109 outputs. Training of the PDNN 110 can advance to the next set of one or more sensor data 108 inputs based on the value of the physics-based cost function satisfying the cost value threshold. The physics-based network trainer 120 can then pass the reduced-noise sensor data 109 to the autoencoder 111 for training.

The network trainer 120 trains the autoencoder 111 with the reduced-noise sensor data 109 passed from the output of the PDNN 110 during training. Training the autoencoder 111 with the reduced-noise sensor data 109 allows the autoencoder 111 to learn to reconstruct a reduced-noise representation of the sensor data 104 when receiving raw sensor data as input. The network trainer 120 can train the autoencoder 111 after the PDNN 110 has been trained or during training of the PDNN 110. For instance, the network trainer 120 can train the PDNN 110 until each data point of the reduced-noise sensor data 109 has been obtained before training the autoencoder 111 with the reduced-noise sensor data 109. Alternatively, the network trainer 120 can train the autoencoder 111 as the reduced-noise sensor data 109 output from the PDNN 110 is obtained, where the training of the PDNN 110 and adjustment of neuron connection weights of the PDNN 110 may continue essentially in parallel with training of the autoencoder 111. The network trainer 120 can thus train the autoencoder 111 and the PDNN 110 "simultaneously."

During training of the autoencoder 111, the autoencoder 111 receives the reduced-noise sensor data 109 at an input layer and applies one or more encode layers to the reduced-noise sensor data to result in an encoded representation of the reduced-noise sensor data 109. The autoencoder 111 then applies one or more decode layers to the encoded representation of the reduced-noise sensor data 109 to produce decoded reduced-noise sensor data. The autoencoder 111 generates reconstructed reduced-noise sensor data 128 based on the decoded reduced-noise sensor data, where the reconstructed reduced-noise sensor data 128 is the output of the autoencoder 111 during training. The autoencoder 111 can leverage any cost function for evaluating the reconstructed reduced-noise sensor data 128 output during training to determine if weights of neuron connections between encode and decode layers should be adjusted. For instance, the autoencoder 111 can use a mean squared error cost function. The network trainer 120 can train the autoencoder 111 on the reduced-noise sensor data 109 until the autoencoder 111 satisfies one or more training criteria, such as a cost threshold enforced for the reconstructed reduced-noise sensor data 128 output by the autoencoder 111. Once the autoencoder 111 has been trained and the trained autoencoder 126 results, the trained autoencoder 126 is deployed to the sensor data noise reduction system 132 of the autoencoder production system 122.

The trained autoencoder 126 is used to denoise sensor data 121, where the sensor data 121 is raw sensor data which can be at least a subset of the sensor data 104. An input layer of the trained autoencoder 126 receives the sensor data 121. The trained autoencoder 126 applies the encode and decode layers to the sensor data 121 to generate reconstructed reduced-noise sensor data 124. The reconstructed reduced-noise sensor data 124 is a reduced-noise representation of the sensor data 121 which the trained autoencoder 126 reconstructs based on the reduced-noise sensor data 109 on which the trained autoencoder 126 learned. Because the trained autoencoder 126 was trained with the reduced-noise sensor data 109 output from the PDNN 110, the trained autoencoder 126 "maps" the sensor data 121 to a reduced-noise representation corresponding to the reduced-noise sensor data 109 when reconstructing the sensor data 121 to produce the reconstructed reduced-noise sensor data 124.

The trained autoencoder 126 can also detect outliers 130 based on the reconstructed reduced-noise sensor data 124. The trained autoencoder 126 can detect the outliers 130 by comparing the sensor data 121 with the reconstructed reduced-noise sensor data 124. For instance, the trained autoencoder 126 may compare each data point of the reconstructed reduced-noise sensor data 124 which it generates with the corresponding data point of the sensor data 121 to determine if a difference between the data points exceeds a reconstruction difference threshold. If the difference exceeds the reconstruction difference threshold, the trained autoencoder 126 indicates that the data point of the sensor data 121 and/or the reconstructed reduced-noise sensor data 124 is as an outlier. For instance, the trained autoencoder 126 may indicate after generating a reconstructed reduced-noise sensor data point that the data point is an outlier. The sensor data noise reduction system 132 can then associate a label or tag with the data point in the sensor data 121 and/or the reconstructed reduced-noise sensor data 124 which indicates that the sensor data point is an outlier. As an example, a normalized value of a fluid velocity in the sensor data 121 may have a value of [0.53], while a corresponding reconstructed fluid velocity value in the reconstructed reduced-noise sensor data 124 may have a value of [0.69]. If a reconstruction difference threshold is established as 0.1, then the trained autoencoder 126 can indicate the fluid velocity value is an outlier. The sensor data noise reduction system 132 may discard the outliers 130 from the sensor data 121 and/or the reconstructed reduced-noise sensor data 124, exclude the outliers 130 from the sensor data 121 and/or the set of reconstructed reduced-noise sensor data 124 generated from use of the trained autoencoder 126, etc.

Figure 2:
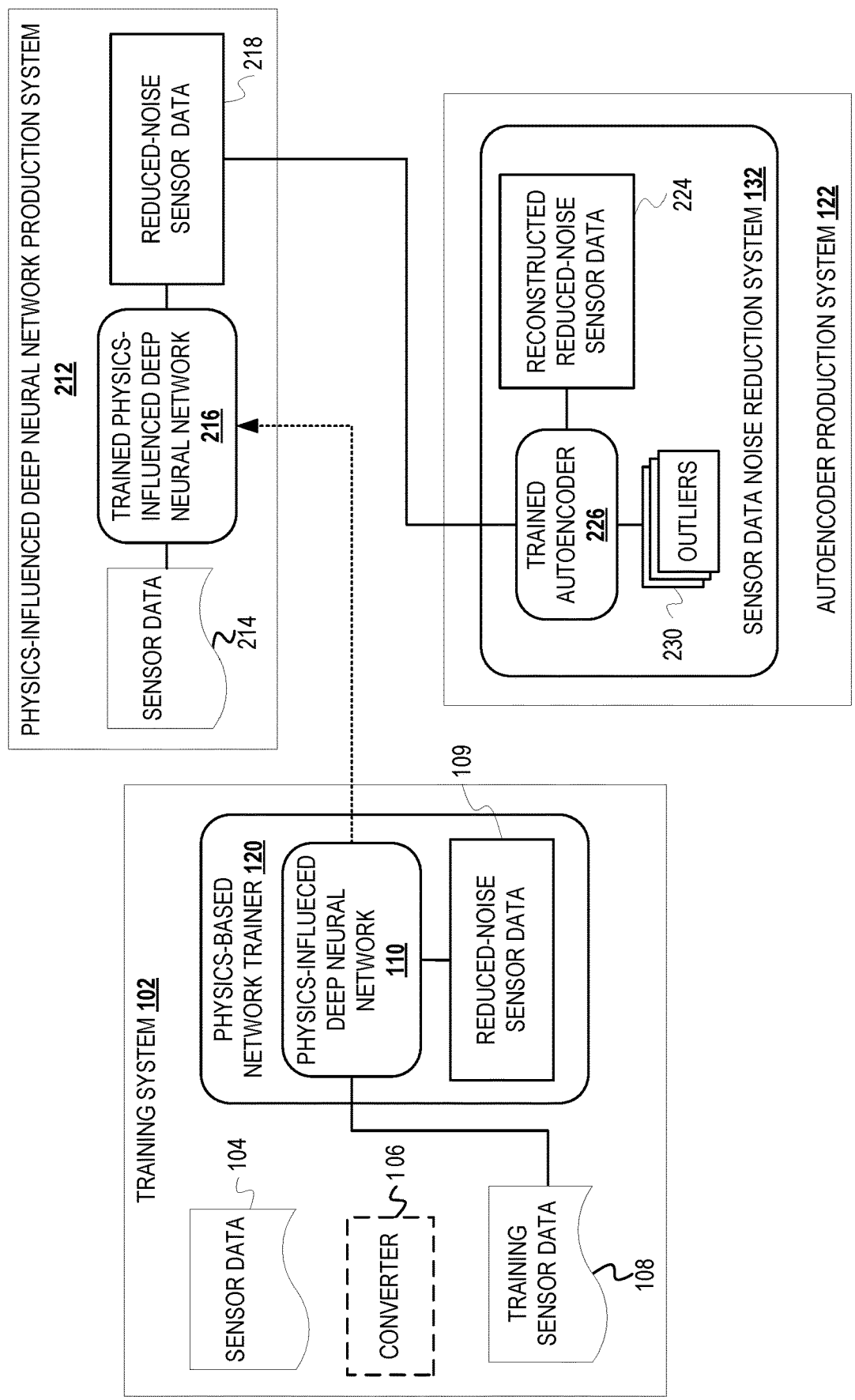
FIG. 2 is an example conceptual diagram of denoising sensor data using a trained PDNN and a trained autoencoder.

FIG. 2 is an example conceptual diagram of denoising sensor data using a trained PDNN and a trained autoencoder. As depicted in FIG. 1, the network trainer 120 trains the PDNN 110 to denoise sensor data 108, where the PDNN 110 leverages a physics-based model and a physics-based cost function which incorporates the physics-based model. During training, the PDNN 110 generates and outputs reduced-noise sensor data 109. Training the PDNN 110 with the sensor data 108 generates a trained PDNN 216 which is deployed to a PDNN production system 212. However, in this example, the reduced-noise sensor data 109 output during training of the PDNN 110 is not input to an autoencoder for training FIG. 2 depicts an example in which a trained autoencoder 226 was trained using a data set different from the reduced-noise sensor data 109. For instance, the trained autoencoder 226 may have been trained with a subset of the sensor data 104, such as the sensor data 108, or with a different set of sensor data. The operations subsequently described occur after the PDNN 110 has been trained based on evaluation of a physics-based cost function as described in reference to FIG. 1 and deployed to the PDNN production system 212 as the trained PDNN 216.

The trained PDNN 216 of the PDNN production system 212 receives sensor data 214 as input. The sensor data 214 may be, for example, a subset of the sensor data 104. The trained PDNN 216 incorporates an optimal set of weights for the neuron connections which were determined based on solving the constrained optimization problem represented above as Equations 3 and 4 to generate the reduced-noise sensor data 109 during training of the PDNN 110, where the PDNN 110 evaluated the reduced-noise sensor data 109 based on valuation of the physics-based cost function represented above as Equation 2. The trained PDNN 216 generates reduced-noise sensor data 218 from the sensor data 214 (i.e., by determining a solution to the constrained optimization problem), which is the output of the PDNN 216. The reduced-noise sensor data 218 is then passed to the autoencoder production system 122 and used as input to the trained autoencoder 226 of the sensor data noise reduction system 132. An input layer of the trained autoencoder 226 receives the reduced-noise sensor data 218. The trained autoencoder 226 applies one or more encode and decode layers to the reduced-noise sensor data 218 to generate reconstructed reduced-noise sensor data 224 as similarly described in reference to FIG. 1. The reconstructed reduced-noise sensor data 224 is the output from the trained autoencoder 226.

As similarly depicted in FIG. 1, the trained autoencoder 226 can detect outliers 230 based on the reconstructed reduced-noise sensor data 224. The trained autoencoder 226 can detect the outliers 230 by comparing the sensor data 214 with the reconstructed reduced-noise sensor data 224. For instance, the trained autoencoder 226 may compare each data point of the reconstructed reduced-noise sensor data 224 which it generates with a corresponding data point from the sensor data 214 to determine if a difference between the data points exceeds a reconstruction difference threshold. If the difference exceeds the reconstruction difference threshold, the trained autoencoder 226 indicates that the data point has been identified as an outlier. For instance, the trained autoencoder 226 may indicate after generating a reconstructed reduced-noise sensor data point that the data point is an outlier. The sensor data noise reduction system 132 can then associate a label or tag with the data point in the sensor data 214 and/or the reconstructed reduced-noise sensor data 224 which indicates that the sensor data point is an outlier. The sensor data noise reduction system 132 may discard the outliers 230 from the sensor data 214 and/or reconstructed reduced-noise sensor data 224, exclude the outliers 230 from the sensor data 214 and/or the set of reconstructed reduced-noise sensor data 224 which ultimately results from use of the trained autoencoder 226, etc.

Figure 3:
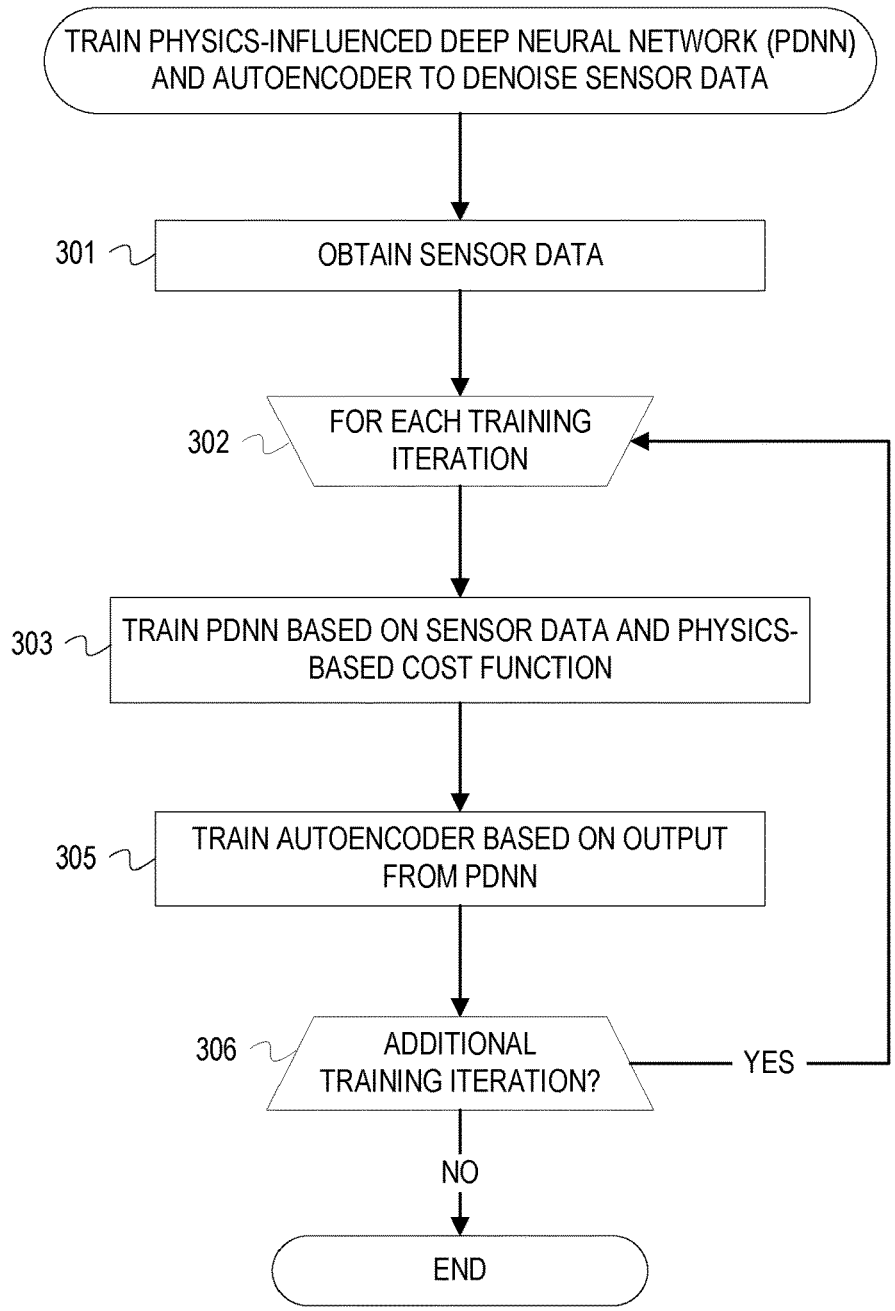
FIG. 3 depicts a flowchart of example operations for training a PDNN and an autoencoder to denoise sensor data, where the autoencoder is trained based on the output of the PDNN.

FIG. 3 depicts a flowchart of example operations for training a PDNN and an autoencoder to denoise sensor data, where the autoencoder is trained based on the output of the PDNN. As described in reference to FIGS. 1 and 2, the PDNN is a deep neural network which incorporates a physics-based cost function based on which the PDNN evaluates reduced-noise sensor data which it generates, where the deep neural network is "transformed" to a PDNN as a result of training based on evaluation of the physics-based cost function. The example operations refer to a physics-based network trainer ("network trainer") as performing the depicted operations for consistency with FIG. 1, although naming of software and program code can vary among implementations. Though the example operations depict the network trainer as training both the PDNN and autoencoder iteratively, the network trainer may train the PDNN before training the autoencoder. For instance, the network trainer can first train a deep neural network to generate the PDNN and can subsequently train the autoencoder based on the output from the PDNN which was generated during training.

At block 301, the network trainer obtains sensor data. The network trainer can obtain sensor data directly from sensors. For example, the sensor data may be voltage values from an electromagnetic receiver that are then directly transmitted to the network trainer. Alternatively, the network trainer can obtain the sensor data through calculations or derivations based on other sensor data. For example, the sensor data can be fluid acceleration values derived from fluid velocity values which are measured by a sensor. The network trainer may also obtain the sensor data from a database which stores sensor data and/or simulation results.

At block 302, the network trainer begins training for each training iteration. The network trainer can allocate any subset of the sensor data for training the PDNN and autoencoder, such as 70% of the sensor data, 75% of the sensor data, etc. The number of training iterations can be determined based on hyperparameters defined for the PDNN (e.g., a number of epochs and a batch size).

At block 303, the network trainer trains the PDNN based on the training sensor data and a physics-based cost function. The network trainer inputs training sensor data to the PDNN at each iteration. The PDNN then can determine reduced-noise sensor data from the training sensor data through constrained optimization of a PDE which incorporates a physics-based model, such as the constrained optimization problem represented above as Equations 3 and 4. The PDNN computes a value of the physics-based cost function, such as the physics-based cost function represented above as Equation 2, using the reduced-noise sensor data to determine whether weights of neuron connections should be adjusted. Training of the PDNN is described in further detail in reference to FIG. 4.

At block 305, the network trainer trains an autoencoder based on the reduced-noise sensor data output from the PDNN. The network trainer can train the autoencoder with each output from the PDNN as the PDNN output is produced such that the PDNN and autoencoder are trained "simultaneously." For instance, the PDNN output used to calculate a value of the physics-based cost function based on which weights of neuron connections within the PDNN are adjusted can additionally be used as a training input to the autoencoder. The network trainer can train the autoencoder using any training method and based on evaluation of any cost function. For instance, the network trainer may train the autoencoder based on minimizing a reconstruction error which is calculated from the reduced-noise sensor data input to the autoencoder and the reconstructed reduced-noise sensor data generated by the autoencoder. The network trainer may enforce a reconstruction error threshold. For example, the reconstruction error threshold may indicate a reconstruction error which, when exceeded, results in adjusting the weights of the autoencoder neuron connections before redetermining the reconstructed reduced-noise sensor data, where the same input may be used after the weights are adjusted. The network trainer can proceed to the next training input or iteration based on the reconstructed reduced-noise sensor output satisfying the reconstruction error threshold.

At block 306, the network trainer determines if additional training iterations remain. If an additional training iteration remains, operations continue at block 302 to continue training. If an additional training iteration does not remain, operations are complete, and the PDNN and autoencoder are considered to be trained.

Figure 4:
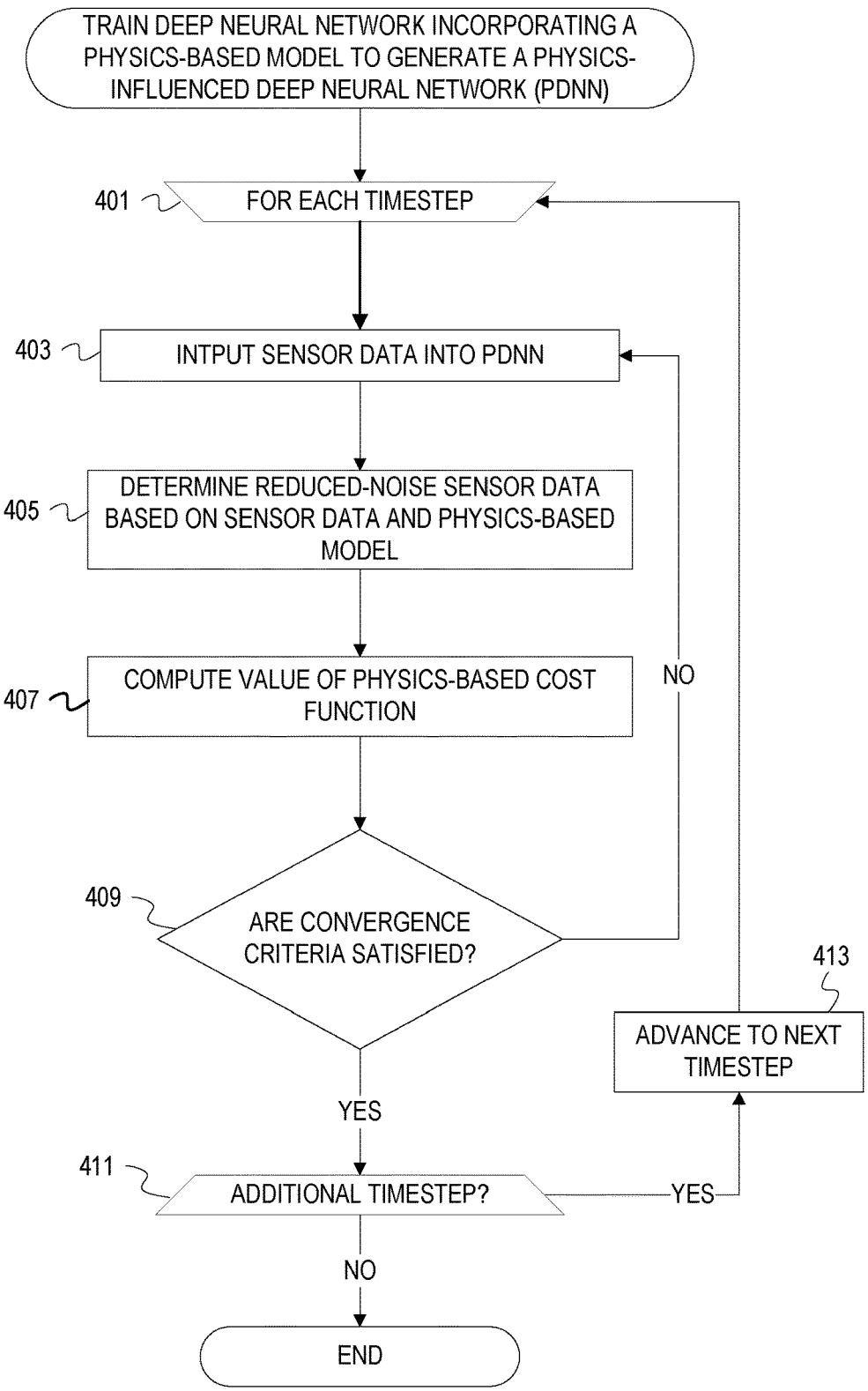
FIG. 4 depicts a flowchart of example operations for training a deep neural network which incorporates a physics-based model over a series of timesteps to generate a PDNN.

FIG. 4 depicts a flowchart of example operations for training a deep neural network which incorporates a physics-based model over a series of timesteps to generate a PDNN (hereinafter referred to as "training the PDNN"). The example operations refer to a physics-based network trainer ("network trainer") and a PDNN which the network trainer trains as performing the example operations for consistency with FIGS. 1 and 2, although naming of software and program code can vary among implementations.

At block 401, the network trainer begins training the PDNN at a first timestep. The network trainer may establish a predetermined time limit or number of timesteps for training the PDNN. For example, the network trainer may establish the number of timesteps based on the number of examples in a training set of sensor data to be used for training.

At block 403, the network trainer inputs sensor data into the PDNN for training. The sensor data may be any data retrieved during a hydrocarbon recovery operation. For example, the sensor data can include data collected for fluid velocity, pressure, temperature, fluid viscosity, fluid density, weight on bit, rotational velocity, etc. The sensor data may be retrieved from the sensors which collect the data or may be communicated to the network trainer by components which operate or are coupled to the sensors.

At block 405, the PDNN determines reduced-noise sensor data from the sensor data. The relationship between the sensor data, reduced-noise sensor data, and the noise affecting the sensor data can be represented as shown in Equation 5 as a function of space and time, where z is the raw sensor data, y is the reduced-noise sensor data, n is the noise, x is the spatial location, and t is the time.

$$z(x,t) = y(x,t) + n(x,t) \quad (5)$$

To recover the reduced-noise sensor data y from the sensor data z which is input into the PDNN, the PDNN can use an optimization technique to minimize the value of the physics-based cost function through the constrained optimization problem represented above as Equations 3 and 4. For example, the PDNN can determine the value for a reduced-noise fluid velocity measurement based on a fluid velocity measurement measured by a sensor by using a gradient descent optimization method and a fluid flow model (e.g., Burgers' equation) incorporated in the cost function as $f(z)$ to determine a solution to Equation 3 subject to the constraint depicted in Equation 4. Burgers' equation can be represented by Equations 6-9, where u is a fluid velocity, v is a fluid viscosity, x is a spatial location that can be normalized to a value between 0 and 1, and t is a time value:

$$\frac{\partial u}{\partial t} - v\frac{\partial^2 u}{\partial x^2} + u\frac{\partial u}{\partial x} = 0 \tag{6}$$

$$u(0, t) = 0 \tag{7}$$

$$u(1, t) = 0 \tag{8}$$

$$u(x, 0) = \sin(\pi x) \tag{9}$$

An analytical solution to Equations 6-9 can be represented as shown in Equation 10 below. Combining Equation 5 and Equation 10 results in Equation 11, where M(x, t) is a noise multiplier value and D(x, t) is a random distribution value.

$$u = \frac{2\pi v \sum_{n-1}^{\infty} a_n \exp(-n^2\pi^2 vt)n\sin(n\pi x)}{a_0 + \sum_{n-1}^{\infty} a_n \exp(-n^2\pi^2 vt)n\cos(n\pi x)} \tag{10}$$

$$z(x, t) = \frac{2\pi v \sum_{n-1}^{\infty} a_n \exp(-n^2\pi^2 vt)n\sin(n\pi x)}{a_0 + \sum_{n-1}^{\infty} a_n \exp(-n^2\pi^2 vt)n\cos(n\pi x)} + M(x, t) \times D(x, t) \tag{11}$$

The representation of Burgers' equation depicted as Equation 11 can be incorporated as $f(z)$ in Equations 2-4. The PDNN determines reduced-noise sensor data, such as the reduced-noise fluid velocity data, based on the solution to Equation 3 subject to the constraint depicted in Equation 4. The reduced-noise sensor data which results is the output of the PDNN.

At block 407, the PDNN computes a value of the physics-based cost function. The PDNN can compute the value of the physics-based cost function represented above as Equation 2, where z is the sensor data input to the PDNN, y is the reduced-noise sensor data output from the PDNN, and $f(z)$ is a physics-based model. For example, the physics-based model can be Burgers' equation, represented above as Equations 6-9. The PDNN can leverage the solution to the physics-based model determined during the optimization at block 405 when computing the value of the physics-based cost function.

At block 409, the network trainer determines if one or more convergence criteria have been satisfied. The network trainer can determine whether the convergence criteria has been satisfied based on whether the physics-based cost function has converged. Convergence of the physics-based cost function may be based on whether the value of the cost function is below a cost threshold. For instance, the network trainer may enforce a cost threshold. The network trainer may determine that the physics-based cost function has converged if the value of the cost function is below the cost threshold. If the convergence criteria are satisfied, operations continue at block 411. If the convergence criteria are not satisfied, operations continue at block 403, where the network trainer restarts training at the current timestep to re-determine the reduced-noise sensor data from the input data. Alternatively, the previously-computed reduced-noise sensor data may be used as input to the PDNN for re-determining the reduced-noise sensor data.

At block 411, the network trainer determines if additional timesteps remain. The network trainer may determine that there are additional timesteps for determining reduced-noise sensor data if any timesteps remain which have not been computed. As another example, the network trainer may determine that there are no additional timesteps to compute if a predetermined time limit is exceeded. If additional timesteps remain, operations continue at block 413, where the network trainer advances to the next timestep to continue training the PDNN. If additional timesteps do not remain, operations are complete, and the PDNN model is considered to be trained.

Figure 5:
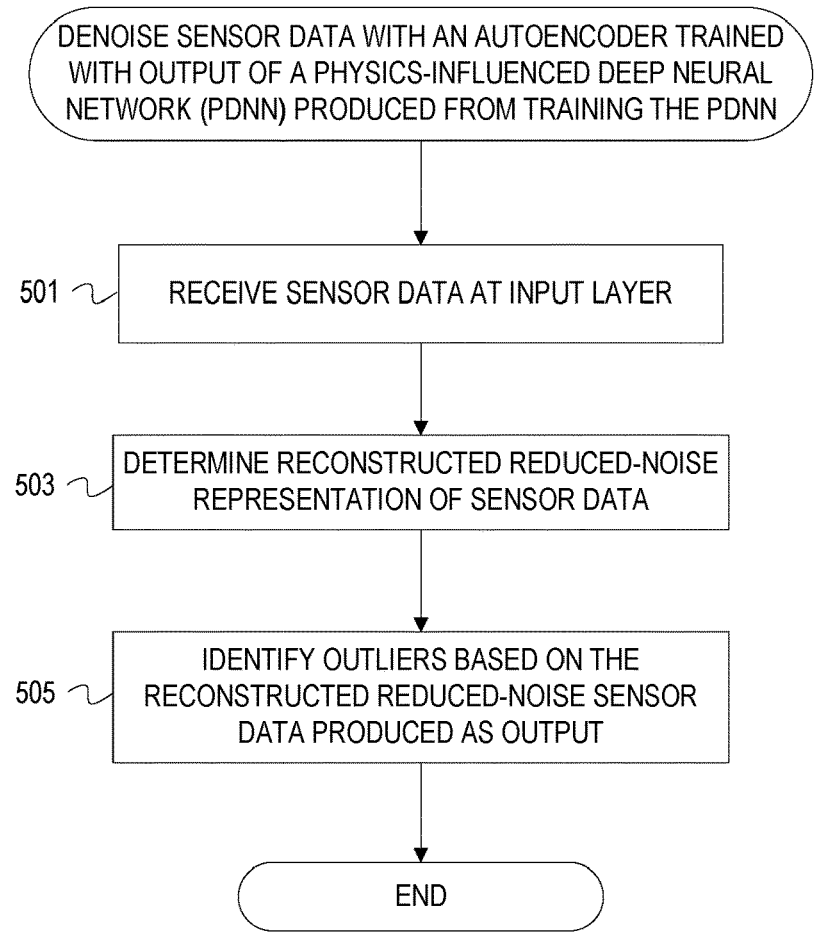
FIG. 5 depicts a flowchart of example operations for denoising sensor data with an autoencoder which was trained with reduced-noise sensor data output from a PDNN during training of the PDNN.

FIG. 5 is a flowchart of example operations for denoising sensor data with an autoencoder which was trained with reduced-noise sensor data output from a PDNN during training of the PDNN. For instance, the sensor data can be denoised with an autoencoder which was trained as described in reference to FIG. 1. The example operations refer to a trained autoencoder as performing the depicted operations for consistency with FIG. 1, although naming of software and program code can vary among implementations.

At block 501, the trained autoencoder receives one or more sensor data inputs. As described with reference to FIG. 3, the sensor data may be obtained directly from sensors (e.g., an electromagnetic receiver), calculated or derived from sensor data obtained directly from sensors, or obtained from a database which stores sensor data and/or simulation results. The trained autoencoder receives the sensor data at its input layer.

At block 503, the trained autoencoder determines a reconstructed reduced-noise representation of the sensor data. The trained autoencoder first applies one or more encode layers to the sensor data to generate encoded sensor data. The trained autoencoder then applies one or more decode layers to the encoded sensor data to generate decoded sensor data. The trained autoencoder generates reconstructed reduced-noise sensor data based on the decoded sensor data. For instance, the trained autoencoder may generate the reconstructed reduced-noise sensor data using the output from the decode layer(s) directly. As another example, the trained autoencoder may generate the reconstructed reduced-noise sensor data by summing the outputs from each decode layer. The reconstructed reduced-noise sensor data is the output of the trained autoencoder. For example, the trained autoencoder may generate and output a reconstructed reduced-noise value of [0.46, 0.59] based on an actual value of [0.6, 0.73]. The reconstructed data output by the trained autoencoder is a reduced-noise representation because the autoencoder was trained with the reduced-noise sensor data output from the PDNN and thus learned the features of the reduced-noise sensor data during training.

At block 505, the trained autoencoder identifies outliers based on the reconstructed reduced-noise sensor data output from the trained autoencoder. The trained autoencoder can detect outliers by comparing the sensor data input and the reconstructed reduced-noise sensor data output. For example, the trained autoencoder may determine whether the difference between a reconstructed reduced-noise sensor data point and a corresponding sensor data point exceeds a reconstruction difference threshold. If the reconstruction difference threshold is exceeded, the trained autoencoder can indicate that the sensor data point and/or the reconstructed reduced-noise sensor data point is an outlier (e.g., by associating an indicator or tag with the sensor data point and/or the reconstructed reduced-noise sensor data point, generating a notification, etc.). Subsequent operations which use the sensor data and/or the reconstructed reduced-noise sensor data can discount the identified outliers. The outliers may alternatively be discarded (e.g., removed from the reconstructed reduced-noise sensor data).

Figure 6:
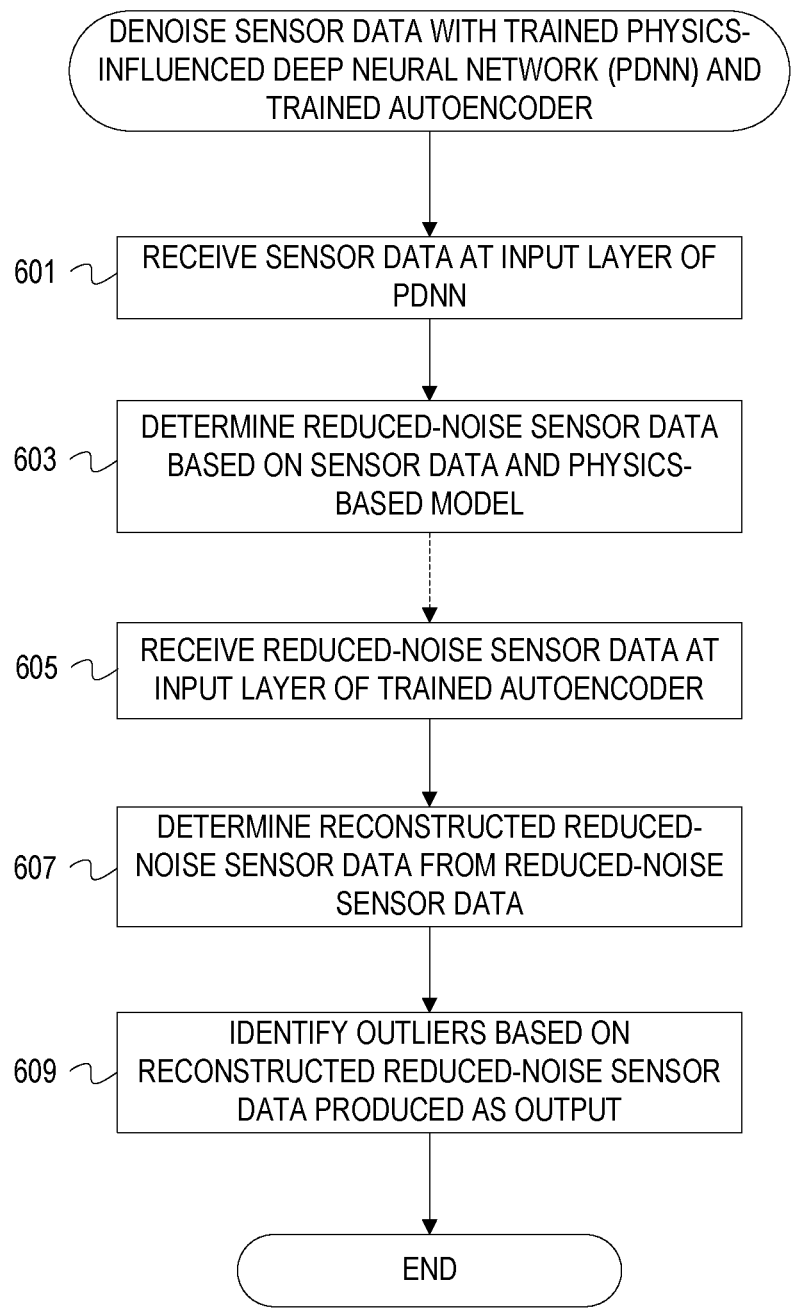
FIG. 6 depicts a flowchart of example operations for denoising sensor data using a trained PDNN and a trained autoencoder.

FIG. 6 is a flowchart of example operations for denoising sensor data using a trained PDNN and a trained autoencoder. The sensor data can be denoised with a PDNN and a denoising autoencoder which were trained as described in reference to FIG. 2. In this example, a trained autoencoder which was not necessarily trained with the PDNN outputs can be used. Operations depicted at blocks 601 and 603 are performed by a trained PDNN. Operations depicted at blocks 605-609 are performed by a trained autoencoder. The example operations refer to a trained PDNN and a trained autoencoder for consistency with FIG. 2, although naming of software and program code can vary among implementations. The example operations may occur such that the output of the trained PDNN is passed to the trained as the trained PDNN generates the output. Alternatively, the example operations may occur such that the trained PDNN accumulates a set of reduced-noise sensor data before passing the set of reduced-noise sensor data to the autoencoder.

At block 601, the trained PDNN receives sensor data. As described with reference to FIG. 3, the sensor data may be obtained directly from sensors, calculated or derived from sensor data obtained directly from sensors, or obtained from a database which stores sensor data and/or simulation results. The PDNN receives the sensor data at its input layer.

At block 603, the trained PDNN determines reduced-noise sensor data based on the sensor data and a physics-based model incorporated in the trained PDNN. The trained PDNN can recover reduced-noise sensor data from the sensor data by determining values of reduced-noise sensor data which optimize a physics-based cost function in which the physics-based model is incorporated. For instance, the trained PDNN can determine a reduced-noise fluid velocity measurement based on a fluid velocity measurement measured by a sensor by solving the constrained optimization problem depicted above as Equations 3 and 4 using a gradient descent optimization method and a fluid flow model incorporated as $f(z)$, such as Burgers' equation. As an example, the trained PDNN can generate a value of [0.5, 0.6] for reduced-noise sensor data based on an actual value of sensor data of [0.6, 0.73] by determining the reduced-noise sensor data as a solution to Equation 3, subject to the constraint depicted in Equation 4, using the actual values of the sensor data and Burgers' equation. The PDNN outputs the reduced-noise sensor data which results from the solution, which is then passed to the trained autoencoder.

At block 605, the trained autoencoder receives the reduced-noise sensor data output from the trained PDNN. The trained autoencoder receives the reduced-noise sensor data at its input layer. The autoencoder was previously trained to denoise sensor data with a set of sensor data which was not necessarily the same sensor data used for training the PDNN.

At block 607, the trained autoencoder determines reconstructed reduced-noise sensor data from the output of the trained PDNN. The trained autoencoder first applies one or more encode layers to the sensor data to generate encoded sensor data. The trained autoencoder then applies one or more decode layers to the encoded sensor data to generate decoded sensor data. The trained autoencoder generates reconstructed reduced-noise sensor data based on the decoded sensor data. For instance, the trained autoencoder may generate the reconstructed reduced-noise sensor data using the output from the decode layer(s) directly. Alternatively, the trained autoencoder may generate the reconstructed reduced-noise sensor data by summing the outputs from each decode layer. The reconstructed reduced-noise sensor data is the output of the trained autoencoder. For example, the trained autoencoder can generate and output a reconstructed reduced-noise value of [0.46, 0.59] based on a reduced-noise value of [0.5, 0.6] which was received as input.

At block 609, the trained autoencoder identifies outliers based on the reconstructed reduced-noise sensor data output from the trained autoencoder. The trained autoencoder can detect outliers by comparing the reduced-noise sensor data input and the reconstructed reduced-noise sensor data output. For example, the trained autoencoder may determine whether the difference between the reconstructed reduced-noise sensor data point and the corresponding reduced-noise sensor data point exceeds a reconstruction difference threshold. Alternatively, a sensor noise reduction system in which the autoencoder is incorporated (e.g., the sensor noise reduction system 132 in FIG. 2) may determine whether the difference between the reconstructed reduced-noise sensor data point and the corresponding sensor data point of the raw sensor data exceeds a reconstruction difference threshold. If the reconstruction difference threshold is exceeded, the trained autoencoder can indicate that the data point is an outlier (e.g., by associating an indicator or tag with the sensor data point and/or the reconstructed reduced-noise sensor data point, generating a notification, etc.). Subsequent operations which use the sensor data and/or the reconstructed reduced-noise sensor data can discount the identified outliers. The outliers may alternatively be discarded through removal from the reconstructed reduced-noise sensor data, for example.

Mathematical Proof for Convergence of PDNN Model

To illustrate PDNN convergence for determining a value y of reduced-noise sensor data, let $f(z)$ be the physics-based model which is incorporated into the physics-based cost function. The function $f(z)$ can be expanded using a Taylor series expansion, where $f$ is expanded in the parameter space around a first physical parameter y as shown in Equation 12 and where operations can include a second physical parameter z as shown in Equation 13, where z is a value of sensor data, y is a value of the reduced-noise sensor data, n is a value of a noise component of the sensor data, x is a spatial location, and t is time:

$$f(z) = f(y) + \frac{f'(y)}{1!}(z-y) + \frac{f''(y)}{2!}(z-y)^2 + \frac{f'''(y)}{3!}(z-y)^2 \ldots \quad (12)$$

$$z(x, t) = y(x, t) + n(x, t) \quad (13)$$

Substituting y+n for z inside the Taylor series expansion and dropping the brackets results in Equation 14 and Equation 15:

$$f(z) = \tag{14}$$
$$f(y) + \frac{f'(y)}{1!}(y+n-y) + \frac{f''(y)}{2!}(y+n-y)^2 + \frac{f'''(y)}{3!}(y+n-y)^2 \ldots$$

$$f(z) = f(y) + \frac{f'(y)}{1!}n + \frac{f''(y)}{2!}n^2 + \frac{f'''(y)}{3!}n^2 \ldots \tag{15}$$

Substituting ƒ(z) for E(z) into the PDE represented as Equation 2 above results in Equation 16 shown below:

$$\|y-z\|^2_{L^2(\Omega)} + \lambda\left[f(y) + \frac{f'(y)}{1!}n + \frac{f''(y)}{2!}n^2 + \frac{f'''(y)}{3!}n^2 \ldots\right] = 0 \tag{16}$$

To satisfy the above minimization, as the value of n approaches zero, the value with noise z should approach the noise-free value y. If this condition is satisfied, the first term of Equation 16 can become zero. In the second term of Equation 16, because the noise tends to zero, the derivative terms can be dropped, and thus ƒ(z) would equal ƒ(y).

Example Plots

Figure 7:
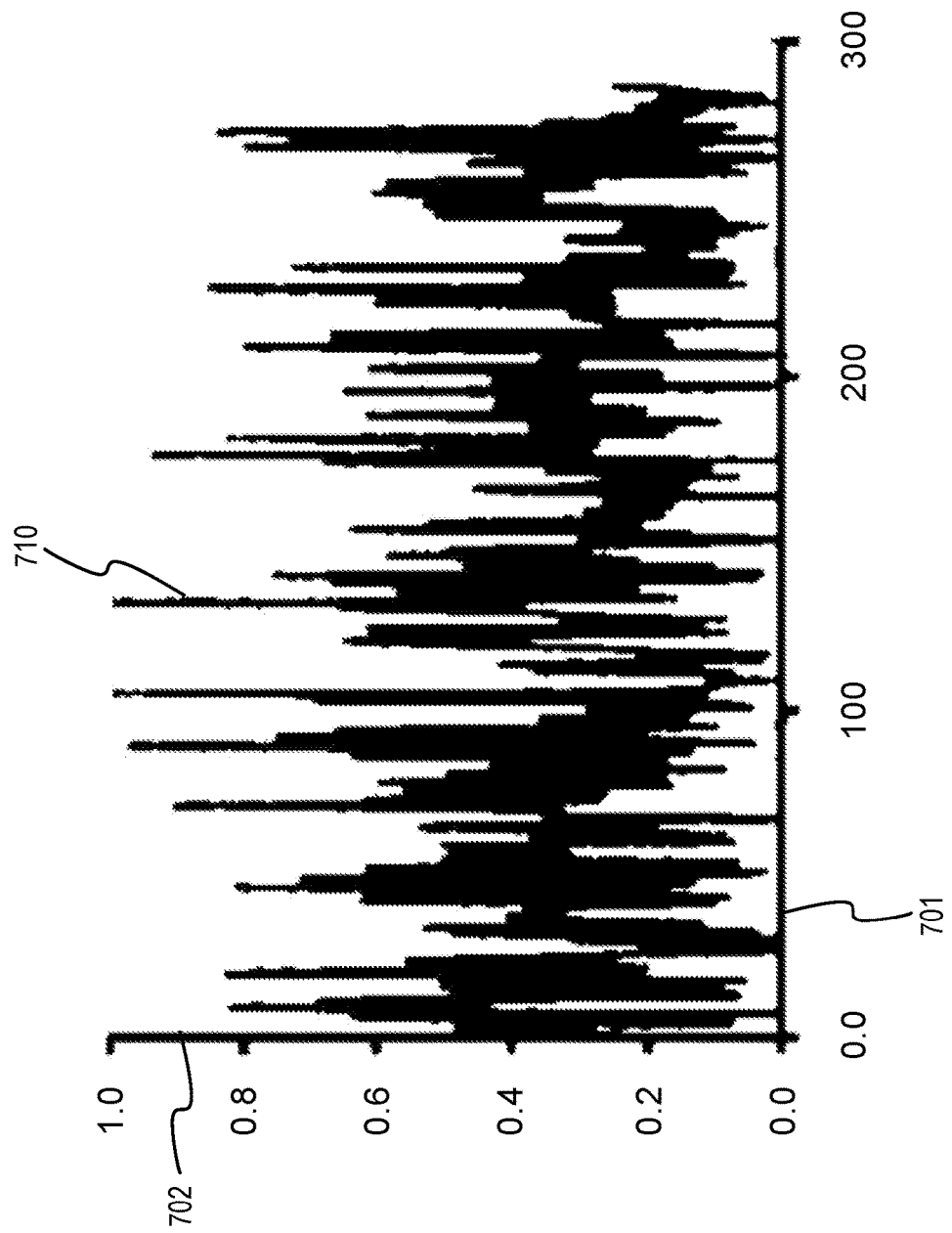
FIG. 7 depicts an example plot of sensor data output by a sensor.

FIG. 7 depicts an example plot of sensor data output by a sensor. A horizontal axis 701 represents a data point index value. In some implementations, the horizontal axis can represent a different parameter domain, such as a time value or spatial value. A vertical axis 702 represents a normalized value for the sensor output. As can be seen by the line 710 representing sensor data, considerable variation can be present within the sensor output data over the parameter domain space represented by the horizontal axis 701.

Figure 8:
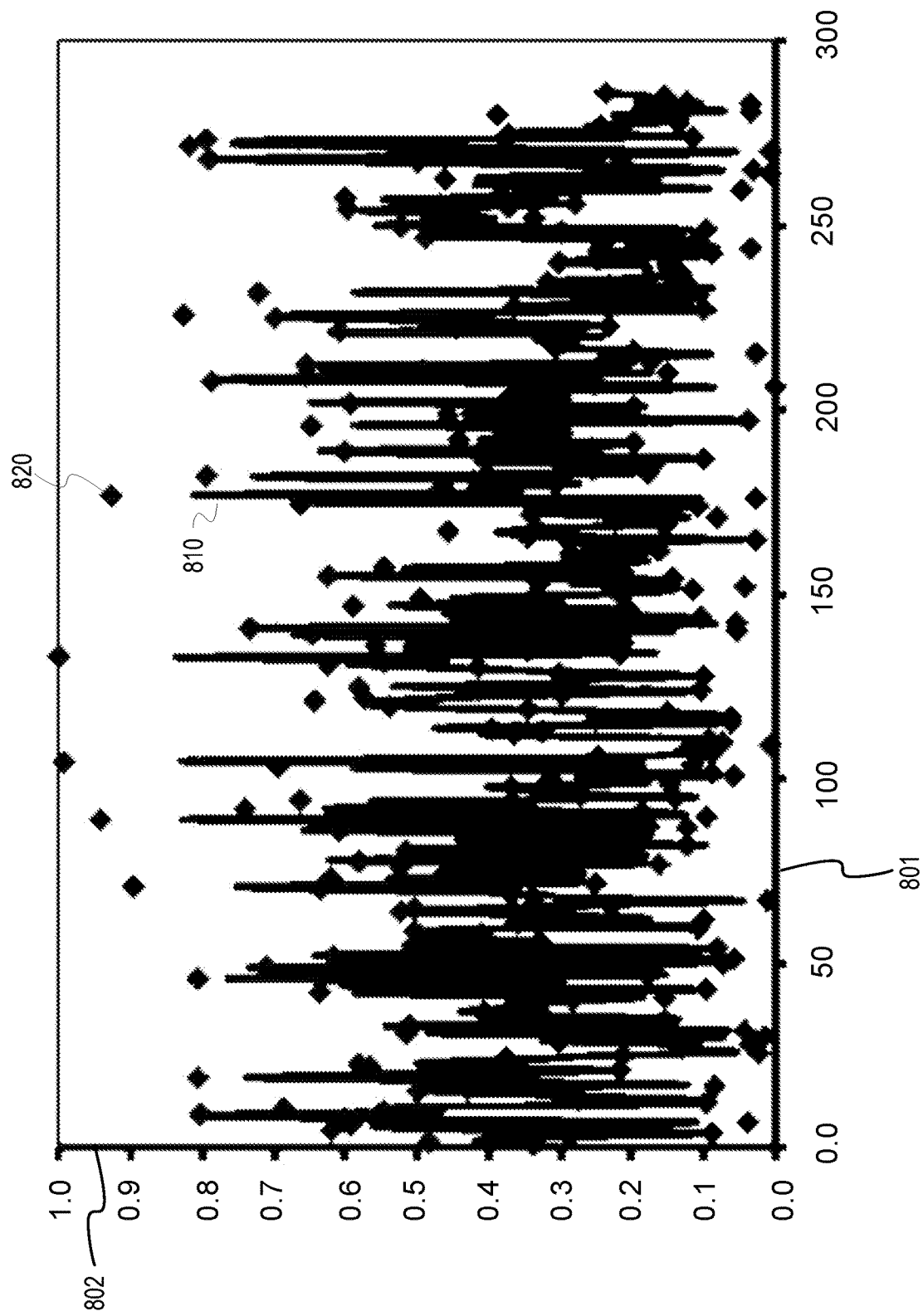
FIG. 8 depicts an example plot comparing sensor data and reduced-noise sensor data using a PDNN.

FIG. 8 depicts an example plot comparing sensor data and reduced-noise sensor data using a PDNN. A horizontal axis 801 represents a data point index value. In some implementations, the horizontal axis can represent a different parameter domain, such as a time value or spatial value. A vertical axis 802 represents a normalized value for the sensor data. The plot also includes a line 810 representing reduced-noise sensor data as determined by a PDNN. The plot also includes a set of points, such as point 820, where each of the set of points represents actual sensor data. As can be seen by a comparison of the values represented by the line 810 and the set of points representing actual sensor data which includes the point 820, values of the reduced-noise sensor data closely track the median values of the actual sensor data, but are less than the greatest and least values of the actual sensor data. The difference between each of the values represented by the line 810 and the corresponding points, such as the point 820, in the set of points may indicate whether a particular point represents an outlier. For example, the value of the reduced-noise sensor data may be 0.8 at the data index value of 178, and the value of the actual sensor data represented by the point 820 may be 0.91. If an output difference threshold is 0.1, then the point 820 may represent an outlier. Outliers can be verified based on using an autoencoder as is further depicted in FIG. 9.

Figure 9:
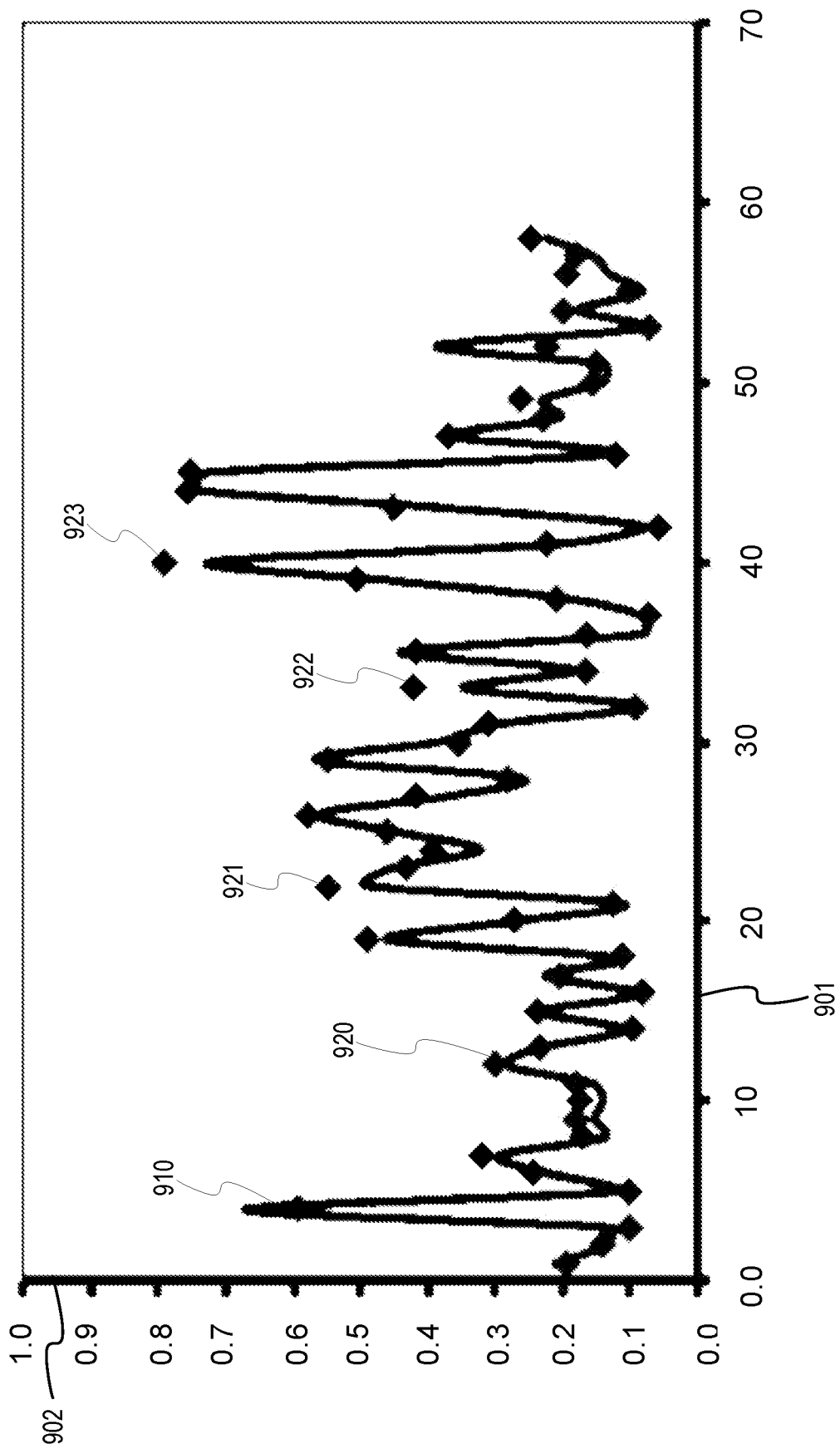
FIG. 9 depicts an example plot comparing actual sensor data with reconstructed reduced-noise sensor data as determined by an autoencoder which was trained with reduced-noise sensor data output from a PDNN during training.

FIG. 9 depicts an example plot comparing actual sensor data with reconstructed reduced-noise sensor data as determined by an autoencoder which was trained with reduced-noise sensor data output from a PDNN during training. A horizontal axis 901 represents a data point index value. In some implementations, the horizontal axis 901 can represent a different parameter domain, such as a time value or spatial value. A vertical axis 902 represents a normalized value for the sensor data. The plot also includes a line 910 representing reconstructed reduced-noise sensor data as determined by a PDNN coupled with an autoencoder. The plot also includes a set of points, such as points 920-923, where each point of the set of points represents actual sensor data. As seen in the plot, the similarity between the reconstructed reduced-noise sensor data and the actual sensor data can be significantly greater than 90%. The points 921-923 can be detected as outliers. For example, the value of the reconstructed reduced-noise sensor data may be 0.75 at the data index value of 40, and the value of the actual sensor data represented by the point 923 may be 0.80. If the output reconstruction difference threshold is 0.04, it can be determined that the point 923 represents an outlier. The data representing and/or corresponding to the point 923 can subsequently be discarded. By reducing noise and producing values used to determine whether to discard outlier data, the autoencoder trained based on PDNN output facilitates detection of significant deviations in sensor output data, such as the data corresponding to the points 921-923. Outliers can be indicative of physical phenomena causing the outlier behavior indicated by the points 921-923.

Figure 10:
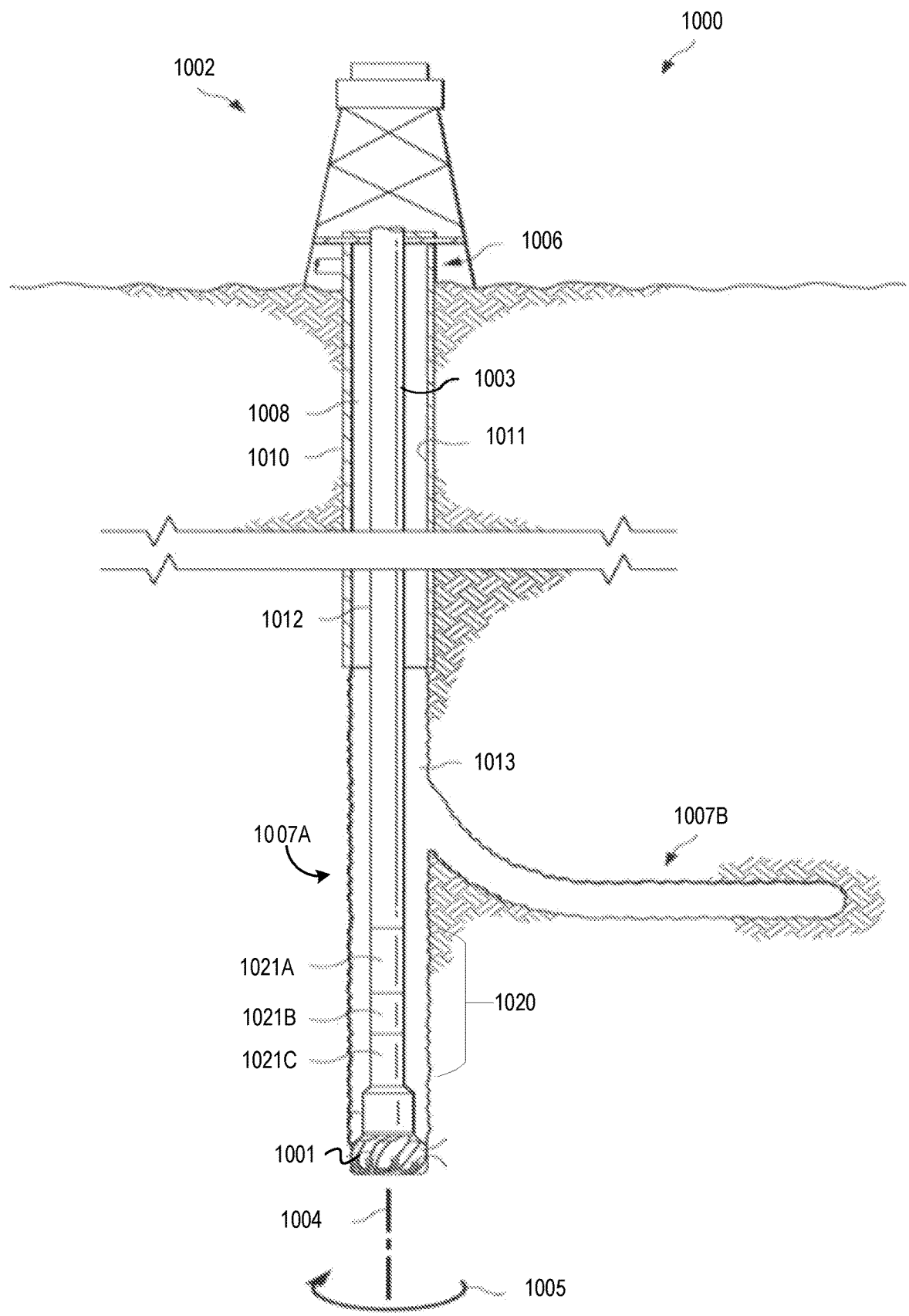
FIG. 10 is an elevation view of a drilling system.

FIG. 10 is an elevation view of a drilling system. A drilling system 1000 is configured to drill into one or more geological formations to form a wellbore 1007A, 1007B; sometimes also referred to as a borehole. The drilling system 1000 can include a drill bit 1001 and a well site 1006. Various types of drilling equipment such as a rotary table, mud pumps and mud tanks (not expressly shown) can be located at the well surface or well site 1006. The well site 1006 can include a drilling rig 1002 that can have various characteristics and features associated with a "land drilling rig." However, other drill bits can be satisfactorily used with drilling equipment located on offshore platforms, drill ships, semi-submersibles and drilling barges.

The drilling system 1000 can include a drill string 1003 associated with the drill bit 1001 that can be used to rotate the drill bit 1001 in a radial direction 1005 around a bit rotational axis 1004 of form a wide variety of wellbores 1007A, 1007B, such as a generally vertical wellbore, or the wellbore 1007A, or a generally horizontal wellbore, or the wellbore 1007B, as shown in FIG. 10. Various directional drilling techniques and associated components of a bottom hole assembly (BHA) 1020 of the drill string 1003 can be used to form a generally horizontal wellbore such as the wellbore 1007B. For example, lateral forces can be applied to the drill bit 1001 proximate to a kickoff location 1013 to form a generally horizontal wellbore (e.g., the wellbore 1007B) extending from a generally vertical wellbore (e.g., the wellbore 1007A). Each of the wellbores 1007A, 1007B can be drilled to a drilling distance, which is the distance between the well surface and the furthest extent of each of the wellbores 1007A, 1007B, respectively.

The BHA 1020 can be formed from a wide variety of components. For example, the components 1021A, 1021B, and 1021C of BHA 1020 can include, but are not limited to the drill bit 1001, drill collars, rotary steering tools, directional drilling tools, downhole drilling motors, reamers, hole enlargers or stabilizers. The number of components, such as drill collars and different types of components 1021A, 1021B, 1021C included in the BHA 1020 can depend upon anticipated downhole drilling conditions and the type of wellbore that will be formed by the drill string 1003 and the drill bit 1001. In addition, the BHA 1020 can include sensors to provide various sensor outputs. Sensor outputs can include values such as fluid velocity, pressure, temperature, fluid viscosity, fluid density, weight on bit, rotational velocity, etc.

The wellbore 1007A can be defined in part by a casing string 1010 that can extend from the well site 1006 to a selected downhole location. Various types of drilling fluid can be pumped from the well site 1006 through the drill string 1003 to the drill bit 1001. The components 1021A, 1021B, and 1021C can be attached to the drill bit 1001 at an uphole end of the drill bit 1001.

Drilling fluids can be directed to flow from the drill string 1003 to respective nozzles included in the drill bit 1001. The drilling fluid can be circulated back to the well site 1006 through an annulus 1008 defined in part by an outside diameter 1012 of the drill string 1003 and an inside diameter 1011 of the casing string 1010.

Figure 11:
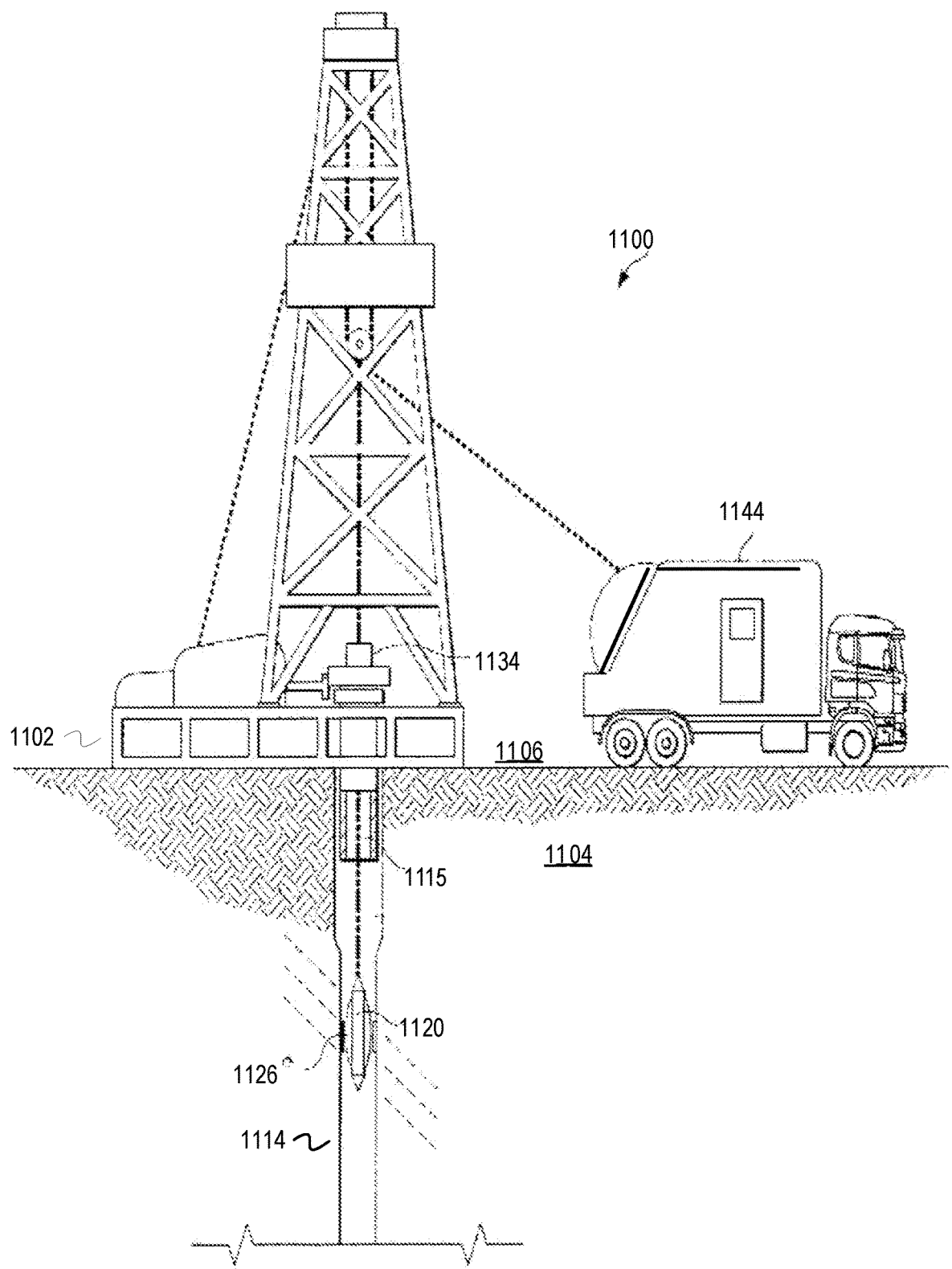
FIG. 11 is an elevation view of a wireline system.

FIG. 11 is an elevation view of a wireline system. Subterranean operations can be conducted using a wireline system 1100 in a borehole 1114. A platform 1102 is positioned over the borehole 1114 in the subterranean formation 1104. The wireline system 1100 can include one or more logging tools 1120 that can be suspended in the borehole 1114 by a conveyance 1115 (e.g., a cable, slickline, or coiled tubing). The logging tool 1120 can be communicatively coupled to the conveyance 1115. The conveyance 1115 can contain conductors for transporting power to the wireline system 1100 and telemetry from the logging tool 1120 to a logging facility 1144. In some embodiments, the conveyance 1115 can be independent of a conductor, as can be the case when using slickline or coiled tubing. The wireline system 1100 can contain a controller 1134 that contains memory, one or more batteries, and/or one or more processors for performing any of the operations described above, as well as storing sensor outputs obtained by various sensors attached to the logging tool 1120.

In certain embodiments, the controller 1134 can be positioned at the surface 1106, in the borehole 1114 (e.g., as part of the logging tool 1120 and/or in the conveyance 1115) or both (e.g., a portion of the processing can occur downhole and a portion can occur at the surface). The controller 1134 can include a control system or a control algorithm. In some embodiments, a control system, an algorithm, or a set of machine-readable instructions can cause the controller 1134 to generate and provide an input signal to one or more elements of the logging tool 1120, such as sensors 1126 disposed on pads and attached to the logging tool 1120. The input signal can cause sensors 1126 disposed on the pads to be active or to provide output signals indicative of sensed properties.

The logging facility 1144 can collect measurements from the logging tool 1120, and can include computing facilities for controlling, processing, or storing the measurements gathered by the logging tool 1120. The computing facilities included in the logging facility 1144 can be communicatively coupled to the logging tool 1120 by way of the conveyance 1115 and can operate similarly to the controller 1134. In certain example embodiments, the controller 1134, which can be located in logging tool 1120, can perform one or more functions of the logging facility 1144.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 303 and 305 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 12:
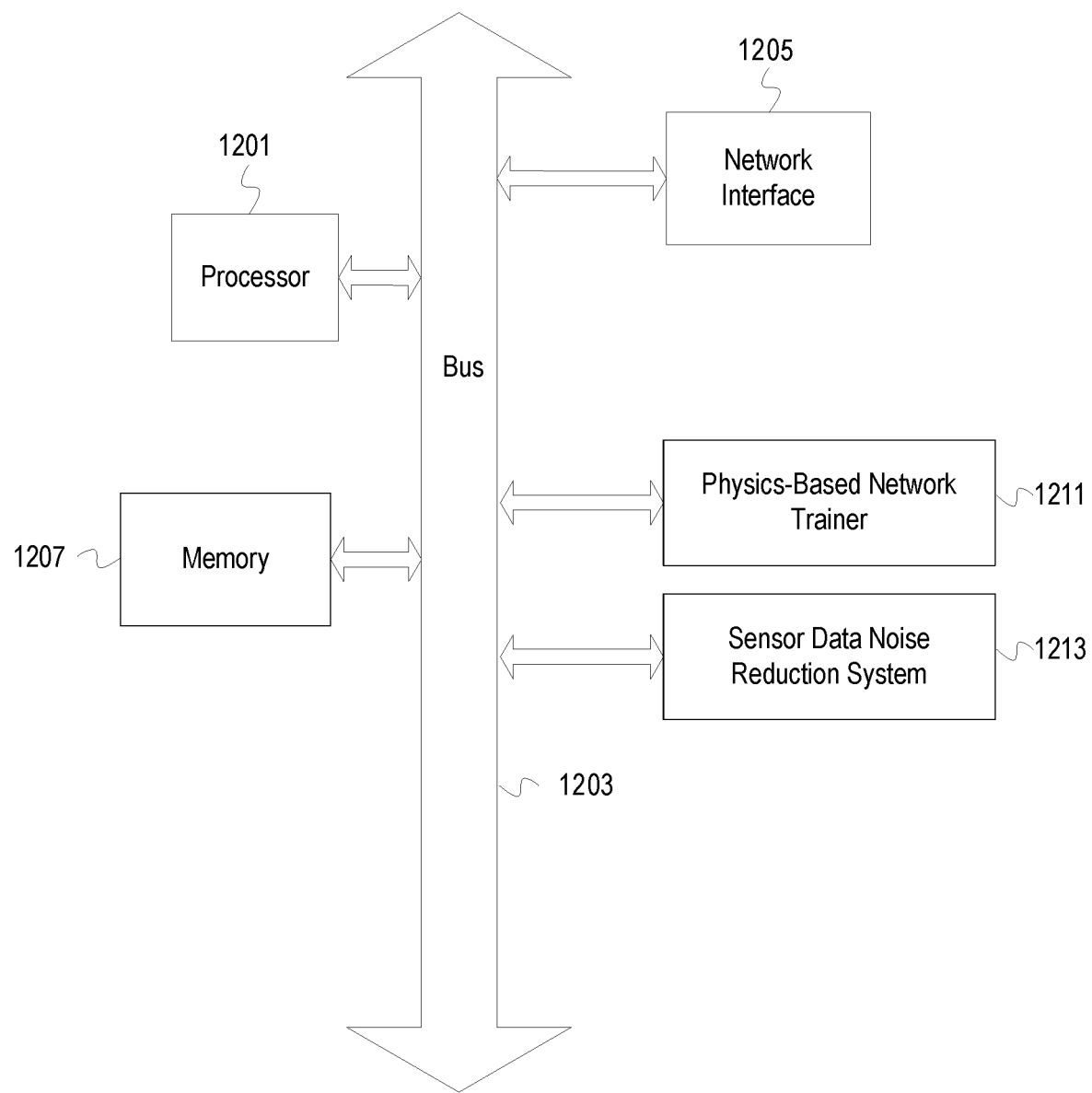
FIG. 12 depicts an example computer system with a physics-based network trainer and a sensor data noise reduction system.

FIG. 12 depicts an example computer system with a physics-based network trainer and a sensor data noise reduction system. The computer system includes a processor 1201 (possibly including multiple processors, multiple cores, multiple nodes, and/or implementing multi-threading, etc.). The computer system includes memory 1207. The memory 1207 may be system memory or any one or more of the above already described possible realizations of machine-readable media. The computer system also includes a bus 1203 and a network interface 1205. The system communicates via transmissions to and/or from remote devices via the network interface 1205 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes physics-based network trainer 1211 and sensor data noise reduction system 1213. The physics-based network trainer 1211 trains a PDNN to generate reduced-noise sensor data from raw sensor data based on a physics-based model and evaluation of a cost function with incorporates the physics-based model. The physics-based network trainer 1211 may also pass the reduced-noise sensor data output from the PDNN during training to an autoencoder to train the autoencoder to generate reconstructed reduced-noise sensor data. The sensor data noise reduction system 1213 facilitates denoising of sensor data by leveraging a trained autoencoder to generate reconstructed reduced-noise sensor data and to detect of outliers in sensor data based on the reconstructed reduced-noise sensor data. Any one of the previously described functionalities may be partially (or entirely) implemented in hardware and/or on the processor 1201. For example, the functionality may be implemented with an application specific integrated circuit, in logic implemented in the processor 1201, in a co-processor on a peripheral device or card, etc. Further, realizations may include fewer or additional components not illustrated in FIG. 12 (e.g., video cards, audio cards, additional network interfaces, peripheral devices, etc.). The processor 1201 and the network interface 1205 are coupled to the bus 1203. Although illustrated as being coupled to the bus 1203, the memory 1207 may be coupled to the processor 1201.

While the aspects of the disclosure are described with reference to various implementations and exploitations, it will be understood that these aspects are illustrative and that the scope of the claims is not limited to them. In general, techniques for denoising sensor data using a deep neural network incorporating a physics-based cost function and an autoencoder as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

A method comprises training a deep neural network (DNN) based on sensor data and a cost function, wherein the cost function incorporates a physics-based model. Reduced-noise sensor data are determined with the DNN during training of the DNN. The reduced-noise sensor data are passed to an autoencoder. The autoencoder is trained based on the reduced-noise sensor data to generate a trained autoencoder, wherein the autoencoder outputs a reconstructed representation of the reduced-noise sensor data.

The method further comprises inputting at least a subset of the sensor data into the trained autoencoder and generating a reconstructed reduced-noise representation of the sensor data with the trained autoencoder.

The method further comprises detecting at least a first outlier in the sensor data based, at least in part, on comparing the sensor data and the reconstructed reduced-noise representation of the sensor data.

The cost function comprises a cost function of the form $$E(y) = \|y-z\|_{L^2(\Omega)}^2 + \lambda f(z),$$

wherein $f(z)$ is the physics-based model, $\lambda$ is a multiplier value, $z$ is a value of the sensor data, U is a domain space on which z is defined, and y is the reduced-noise sensor data.

Training the DNN and training the autoencoder are performed simultaneously.

Determining reduced-noise sensor data with the DNN comprises determining the reduced-noise sensor data as a solution to a partial differential equation (PDE) through constrained optimization, wherein the PDE incorporates the physics-based model.

The physics-based model comprises a differentiable physics-based function in the oil and gas domain.

The physics-based model comprises at least one of Burgers' equation, Darcy's law, and a hydraulic fracturing model equation.

The sensor data comprises at least one of fluid velocity data, pressure data, temperature data, fluid viscosity data, fluid density data, weight on bit data, and drill bit rotational velocity data.

One or more non-transitory machine-readable media comprise program code for denoising sensor data, the program code to, based on receiving sensor data, input at least a first subset of the sensor data into a deep neural network (DNN). A first set of reduced-noise sensor data is generated based, at least in part, on the first subset of the sensor data and a physics-based model. The first set of reduced-noise sensor data is evaluated based on a calculation of a value of a cost function, wherein the cost function incorporates the physics-based model. A trained DNN is generated from the DNN based on evaluation of the first set of reduced-noise sensor data.

The non-transitory machine-readable media further comprise program code to pass the first set of reduced-noise sensor data which is output during generation of the trained DNN to a first autoencoder and train the first autoencoder based on the first set of reduced-noise sensor data to generate a first trained autoencoder.

The non-transitory machine-readable media further comprise program code to input at least a second subset of the sensor data into the first trained autoencoder, determine a first set of reconstructed reduced-noise sensor data based on output of the first trained autoencoder, and detect at least a first outlier of at least one of the second subset of the sensor data and the first set of reconstructed reduced-noise sensor data.

The cost function comprises a cost function of the form $$E(y) = \|y-z\|_{L^2(\Omega)}^2 + \lambda f(z),$$

wherein $f(z)$ is the physics-based model, $\lambda$ is a multiplier value, z is a value of a first of the sensor data, $\Omega$ is a domain space on which z is defined, and y is a value from the first set of reduced-noise sensor data.

The non-transitory machine-readable media further comprise program code to obtain a second set of reduced-noise sensor data, wherein the second set of reduced-noise sensor data is generated by the trained DNN, input the second set of reduced-noise sensor data into a second trained autoencoder, and determine a second set of reconstructed reduced-noise sensor data based on output of the second trained autoencoder.

An apparatus comprises a processor and a machine-readable medium having program code executable by the processor to cause the apparatus to train a deep neural network (DNN) based on sensor data and a cost function, wherein the cost function incorporates a physics-based model. Reduced-noise sensor data are determined with the DNN during training of the DNN. The reduced-noise sensor data are passed to an autoencoder. The autoencoder is trained based on the reduced-noise sensor data to generate a trained autoencoder, wherein the autoencoder outputs a reconstructed representation of the reduced-noise sensor data.

The apparatus further comprises program code executable by the processor to cause the apparatus to input at least a subset of the sensor data into the trained autoencoder and generate a reconstructed reduced-noise representation of the sensor data with the trained autoencoder.

The cost function comprises a cost function of the form $$E(y) = \|y-z\|_{L^2(\Omega)}^2 + \lambda f(z),$$

wherein $f(z)$ is the physics-based model, $\lambda$ is a multiplier value, z is a value of the sensor data, $\Omega$ is a domain space on which z is defined, and y is the reduced-noise sensor data.

The program code executable by the processor to cause the apparatus to determine reduced-noise sensor data with the DNN comprises program code executable by the processor to cause the apparatus to determine the reduced-noise sensor data as a solution to a partial differential equation (PDE) through constrained optimization, wherein the PDE incorporates the physics-based model.

The DNN and autoencoder are trained simultaneously.

The physics-based model comprises a differentiable physics-based function in the oil and gas domain.

What is claimed is:

1. A method comprising:
   training a deep neural network (DNN) based on sensor data and a cost function, wherein the cost function incorporates a physics-based model;
   determining reduced-noise sensor data with the DNN during training of the DNN;
   passing the reduced-noise sensor data to an autoencoder; and
   training the autoencoder based on the reduced-noise sensor data to generate a trained autoencoder, wherein the autoencoder outputs a reconstructed representation of the reduced-noise sensor data.

2. The method of claim 1 further comprising:
   inputting at least a subset of the sensor data into the trained autoencoder; and
   generating a reconstructed reduced-noise representation of the sensor data with the trained autoencoder.

3. The method of claim 2 further comprising detecting at least a first outlier in the sensor data based, at least in part, on comparing the sensor data and the reconstructed reduced-noise representation of the sensor data.

4. The method of claim 1, wherein the cost function comprises a cost function of the form $$E(y) = \|y-z\|_{L^2(\Omega)}^2 + \lambda f(z),$$

wherein $f(z)$ is the physics-based model, $\lambda$ is a multiplier value, z is a value of the sensor data, $\Omega$ is a domain space on which z is defined, and y is the reduced-noise sensor data.

5. The method of claim 1, wherein training the DNN and training the autoencoder are performed simultaneously.

6. The method of claim 1, wherein determining reduced-noise sensor data with the DNN comprises determining the reduced-noise sensor data as a solution to a partial differential equation (PDE) through constrained optimization, wherein the PDE incorporates the physics-based model.

7. The method of claim 1, wherein the physics-based model comprises a differentiable physics-based function in the oil and gas domain.

8. The method of claim 7, wherein the physics-based model comprises at least one of Burgers' equation, Darcy's law, and a hydraulic fracturing model equation.

9. The method of claim 1, wherein the sensor data comprises at least one of fluid velocity data, pressure data, temperature data, fluid viscosity data, fluid density data, weight on bit data, and drill bit rotational velocity data.

10. One or more non-transitory machine-readable media comprising program code for denoising sensor data, the program code to:
   based on receiving sensor data, input at least a first subset of the sensor data into a deep neural network (DNN), generate a first set of reduced-noise sensor data based, at least in part, on the first subset of the sensor data and a physics-based model;

evaluate the first set of reduced-noise sensor data based on a calculation of a value of a cost function, wherein the cost function incorporates the physics-based model; and generate a trained DNN from the DNN based on evaluation of the first set of reduced-noise sensor data.

11. The non-transitory machine-readable media of claim 10, further comprising program code to:

pass the first set of reduced-noise sensor data which is output during generation of the trained DNN to a first autoencoder; and train the first autoencoder based on the first set of reduced-noise sensor data to generate a first trained autoencoder.

12. The non-transitory machine-readable media of claim 11, further comprising program code to:

input at least a second subset of the sensor data into the first trained autoencoder;

determine a first set of reconstructed reduced-noise sensor data based on output of the first trained autoencoder; and detect at least a first outlier of at least one of the second subset of the sensor data and the first set of reconstructed reduced-noise sensor data.

13. The non-transitory machine-readable media of claim 10, wherein the cost function comprises a cost function of the form $$E(y)=\|y-z\|_{L^2(\Omega)}^2+\lambda f(z),$$

wherein $f(z)$ is the physics-based model, $\lambda$ is a multiplier value, z is a value of a first of the sensor data, $\Omega$ is a domain space on which z is defined, and y is a value from the first set of reduced-noise sensor data.

14. The non-transitory machine-readable media of claim 10, further comprising program code to:

obtain a second set of reduced-noise sensor data, wherein the second set of reduced-noise sensor data is generated by the trained DNN;

input the second set of reduced-noise sensor data into a second trained autoencoder; and determine a second set of reconstructed reduced-noise sensor data based on output of the second trained autoencoder.

15. An apparatus comprising:
a processor; and
a machine-readable medium having program code executable by the processor to cause the apparatus to,
train a deep neural network (DNN) based on sensor data and a cost function, wherein the cost function incorporates a physics-based model;
determine reduced-noise sensor data with the DNN during training of the DNN;
pass the reduced-noise sensor data to an autoencoder; and
train the autoencoder based on the reduced-noise sensor data to generate a trained autoencoder, wherein the autoencoder outputs a reconstructed representation of the reduced-noise sensor data.

16. The apparatus of claim 15, further comprising program code executable by the processor to cause the apparatus to:

input at least a subset of the sensor data into the trained autoencoder; and generate a reconstructed reduced-noise representation of the sensor data with the trained autoencoder.

17. The apparatus of claim 15, wherein the cost function comprises a cost function of the form $$E(y)=\|y-z\|_{L^2(\Omega)}^2+\lambda f(z),$$

wherein $f(z)$ is the physics-based model, $\lambda$ is a multiplier value, z is a value of the sensor data, $\Omega$ is a domain space on which z is defined, and y is the reduced-noise sensor data.

18. The apparatus of claim 15, wherein program code executable by the processor to cause the apparatus to determine reduced-noise sensor data with the DNN comprises program code executable by the processor to cause the apparatus to determine the reduced-noise sensor data as a solution to a partial differential equation (PDE) through constrained optimization, wherein the PDE incorporates the physics-based model.

19. The apparatus of claim 15, wherein the DNN and autoencoder are trained simultaneously.

20. The apparatus of claim 15, wherein the physics-based model comprises a differentiable physics-based function in the oil and gas domain.

* * * * *